US011334380B2

(12) United States Patent
Aguilera et al.

(10) Patent No.: US 11,334,380 B2
(45) Date of Patent: May 17, 2022

(54) REMOTE MEMORY IN HYPERVISOR

(71) Applicant: VMWARE, INC., Palo Alto, CA (US)

(72) Inventors: Marcos Aguilera, Palo Alto, CA (US); Keerthi Kumar, Bangalore (IN); Pramod Kumar, Bangalore (IN); Arun Ramanathan, Palo Alto, CA (US); Pratap Subrahmanyam, Palo Alto, CA (US); Sairam Veeraswamy, Bangalore, IN (US); Rajesh Venkatasubramanian, Palo Alto, CA (US); Manish Mishra, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 273 days.

(21) Appl. No.: 16/698,994

(22) Filed: Nov. 28, 2019

(65) Prior Publication Data

US 2021/0019168 A1 Jan. 21, 2021

(30) Foreign Application Priority Data

Jul. 16, 2019 (IN) .............................. 201941028622

(51) Int. Cl.
| | |
|---|---|
| *G06F 9/46* | (2006.01) |
| *G06F 9/455* | (2018.01) |
| *G06F 3/06* | (2006.01) |
| *G06F 16/907* | (2019.01) |
| *G06F 12/1009* | (2016.01) |

(52) U.S. Cl.
CPC ........ *G06F 9/45558* (2013.01); *G06F 3/0607* (2013.01); *G06F 3/067* (2013.01); *G06F 3/0658* (2013.01); *G06F 12/1009* (2013.01); *G06F 16/907* (2019.01); *G06F 2009/4557* (2013.01); *G06F 2009/45583* (2013.01); *G06F 2209/5011* (2013.01)

(58) Field of Classification Search
CPC .. G06F 9/45558; G06F 16/907; G06F 3/0607; G06F 3/0658; G06F 3/067; G06F 12/1009; G06F 2009/4557; G06F 2009/45583; G06F 2209/5011
See application file for complete search history.

(56) References Cited

PUBLICATIONS

Chen et al. ("REMOCA: Hypervisor Remote Disk Cache", 2009 IEEE International Symposium on Parallel and Distributed Processing with Applications). (Year: 2009).*

* cited by examiner

*Primary Examiner* — Wissam Rashid
(74) *Attorney, Agent, or Firm* — Patterson & Sheridan, LLP

(57) ABSTRACT

The disclosure provides an approach for creating a pool of memory out of local memories of host machines, and providing that pool for the hosts to use. The pool is managed by a controller that keeps track of memory usage and allocated memory among hosts. The controller allocates or reclaims memory between hosts, as needed by the hosts. Memory allocated from a second host to a first host may then be divided into smaller portions by the first host, and further allocated to virtual machines executing within the first host.

16 Claims, 3 Drawing Sheets

REMOTE MEMORY IN HYPERVISOR

RELATED APPLICATIONS

Benefit is claimed under 35 U.S.C. 119(a)-(4) to Foreign Application Serial No, 201941028622 filed in India entitled "REMOTE MEMORY IN HYPERVISOR", on Jul. 16, 2019, by VMWARE, INC., which is herein incorporated in its entirety by reference for all purposes.

BACKGROUND

A computing device within a data center might be short on its own local memory while other computing devices within a data center might be underutilizing their own local memories. The computing device might also have old memory, while other hosts might have newer and faster memories. Upgrading memory on a given device may be expensive. Therefore, a need exists to disaggregate memory from its local hosts.

SUMMARY

Embodiments provide a method of obtaining memory for use of a first host, the method comprising: determining a second host that is capable of providing memory for use by the first host; obtaining a region of memory from the second host for use by the first host; updating a first memory metadata to indicate that the region of memory has been obtained from the second host for use of the first host; dividing, by the first host, the obtained region of memory into one or more sub-portions; and allocating the one or more sub-portions for use by one or more virtual computing instances (VCIs) executing on the first host.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The disclosure provides an approach for creating a pool of memory out of local memories of hosts, and providing that pool for the hosts to use. The pool is managed by a controller that keeps track of memory usage metadata and allocated memory among hosts.

Figure 1:
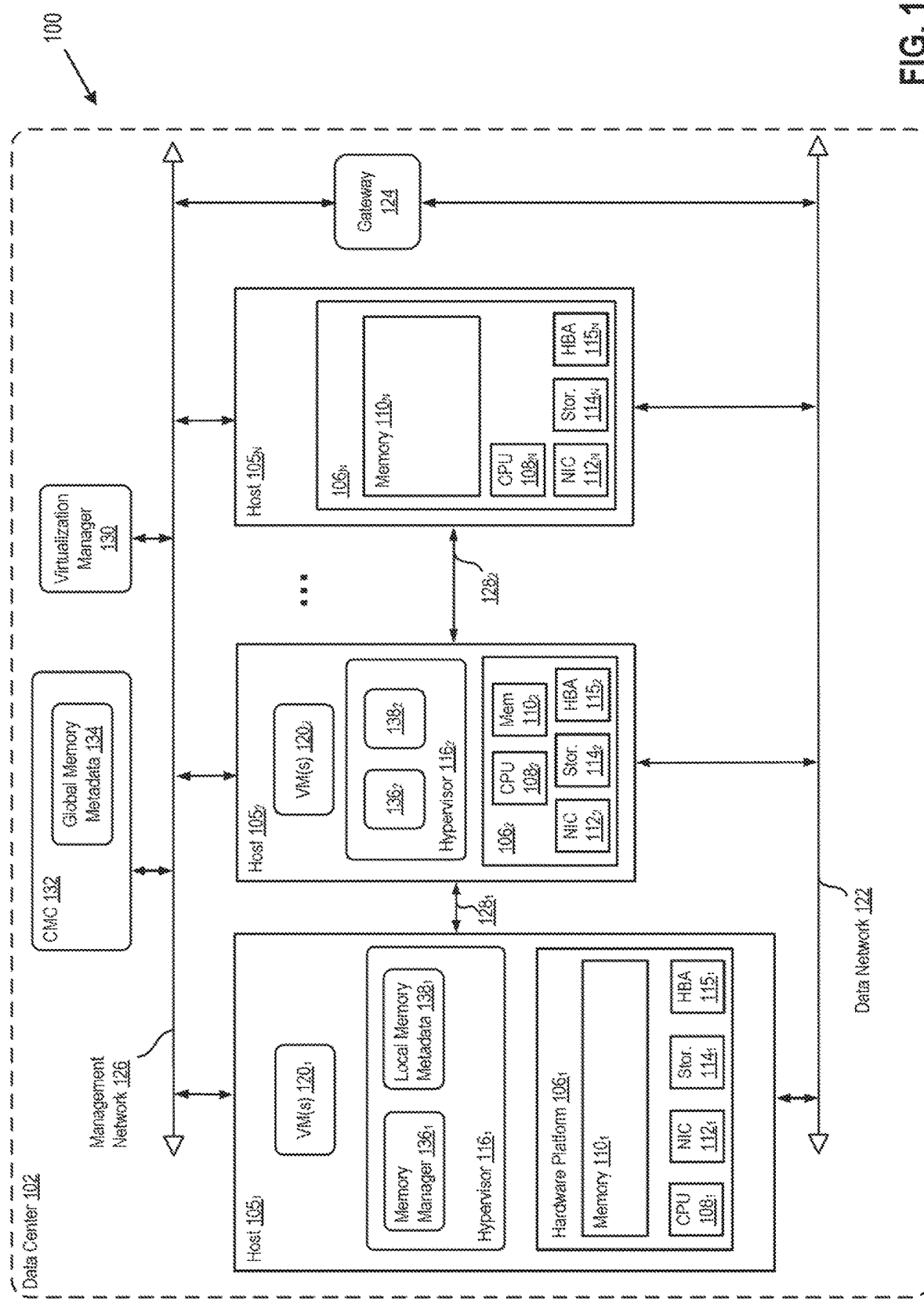
FIG. 1 depicts a block diagram of a computer system in which one or more embodiments of the present disclosure may be utilized.

FIG. 1 depicts a block diagram of a computer system 100 in which one or more embodiments of the present disclosure may be utilized. Computer system 100 includes data center 102 which may be connected to an outside network, such as through a gateway 124. Data center 102 may be, for example, a private cloud or a virtual data center of a public cloud.

Data center 102 includes host(s) 105, a virtualization manager 130, a cluster memory controller (CMC) 132, a gateway 124, a management network 126, a data network 122, and links 128. As used herein, a "cluster" is used to refer to a group of hosts 105, such as for example, (a) a group comprising or consisting of some or all hosts 105 within data center 102, (b) a group consisting of all hosts within a rack of data center 102, or (c) a logical cluster of hosts in a private or public cloud. Although CMC 132 and virtualization manager 130 are shown as separate components, they may be a single component, such that both functions are performed by either CMC 132, virtualization manager 130, or another component. CMC 132 and virtualization manager may be located within the same physical or logical server.

Each of hosts 105 may be constructed on a server grade hardware platform 106, such as an x86 or Advanced RISC (reduced instruction set computer) Machines (ARM) architecture platform. For example, hosts 105 may be geographically co-located servers on the same rack. Each host 105 shown in FIG. 1 may be substantially the same, containing substantially the same components. Alternatively, some hosts 105 may be "memory servers" or "memory expansion hosts" configured primarily for allocation of their memory to other hosts 105, as further discussed below.

Hosts 105 are connected via management network 126, data network 122, and optionally links 128. Management network 126 is a network used to send control information, such as commands or information used to change configuration states, between components of data center 102. Data network 126 is a network used to send non-control information between components of data center 102. Although networks 122 and 126 are shown as separate entities, they may be implemented by shared physical networking components. Hosts 105 may also be connected by high-speed links 128. Links 128 may be, for example, Ethernet links, Internet links, links supporting the Internet Protocol (IP), links supporting the Unreliable Datagram Protocol (UDP), links supporting the Transmission Control Protocol (TCP), links supporting Remote Direct Memory Access (RDMA), InfiniBand links, wireless network links, radio links, fiber connected links, copper links, or any other links used to connect computer systems or components. A link need not be a physical link, but may be a logical link implemented by a collection of physical links. In an embodiment, a link 128 exists between each pair of hosts 105, such that each host 105 has a low latency connection to every other host 105 within data center 102. In other embodiments, hosts 105 instead are only connected via management network 126 and/or data network 122.

Host 105 is configured to provide a virtualization layer, also referred to as a hypervisor 116, that abstracts processor, memory, storage, and networking resources of hardware platform 106 into multiple VMs 120. VMs on the same host 105 may run concurrently. Each of VMs 120 connect to hypervisor 116 through virtual ports (not shown). Hypervisor 116 may run on top of operating system (not shown) in host 105 or may run directly on hardware platform 106 of host 105. One example of a hypervisor 116 is a VMware ESXi™ hypervisor provided as part of the VMware vSphere® solution made commercially available from VMware, Inc. of Palo Alto, Calif. Although certain embodiments are described herein with respect to VMs, the same principles and techniques may also apply to other appropriate virtual computing instances (VCIs) (e.g., containers (e.g., Docker containers), data compute nodes, isolated user space instances, namespace containers, serverless functions, lambda functions, etc.). In an embodiment, a VCI is an executable that abstracts processor, memory, storage, and/or networking resources of hardware platform 106.

Hypervisor 116 includes memory manager 136 and local memory metadata 138. Memory manager 136 manages memory allocated to components local to host 105 on which memory manager 136 is located. As used herein, the term "local" refers to a component located on the same host 105 as that which is being discussed, to a function performed on the same host 105 as that which is being discussed, or to information obtained from the same host 105 as that which is being discussed. Memory manager 136 allocates memory from (a) a pool that has been generally allocated to its local host 105 or local hypervisor 116 by CMC 132 to (b) software, applications, and/or VMs 120 running on local host 105. The memory allocated by memory manager 136 may be physically located internal to local host 105 or external to local host 105. For example, CMC 132 may allocate a region of memory of host $105_N$ to host $105_1$, and then memory manager $136_1$ may further subdivide and allocate sub-portions of the region of memory to VMS $120_1$. Memory manager 136 may allocate memory in a size or a granularity that is as small as a single memory page.

Memory manager 136 tracks what memory pages have been allocated to what component (e.g., VM 120) within the local host 105 by storing metadata regarding memory allocation in local memory metadata 138. Local memory metadata 138 may include, for example, a table that lists metrics, such as what memory pages (e.g., by address or other identifier) are allocated to each local VM 120, and how much or how many memory pages are allocated to each local VM 120, and to what extent is each memory page used by each VM 120. Local memory metadata 138 may include metrics such as how much total memory is being used and the physical origin of that memory. The physical origin may be, for example, one of hosts 105. Local memory metadata 138 may include a subpart of global memory metadata, such as information about memory 110 from other hosts 105, the information including metadata on what portion of memory 110 has been allocated for the use of the local host 105 of that memory 110, but has not yet been actually used by that local host 105.

Although FIG. 1 shows an instance of memory manager 136 in each hypervisor 116, separate from CMC 132, each instance of memory manager 136 may instead be a logical extension of CMC 132. That is, memory manager 136 may be a component of CMC 132 executing within hypervisor 116.

In an embodiment, memory manager 136 uses its local memory 110 as a cache for frequently used memory pages, while swapping out less frequently used memory pages to an external memory expansion host 105 or to other memory or storage, such as local storage 114 or external memory or storage connected to the local host 105 through NIC 112 or HBA 115. Memory manager 136 may use a conventional cache algorithm to swap pages between local memory 110 and other memory or storage devices. The cache algorithm may be, for example, first-in-first-out, last-in-first-out, least recently used, most recently used, random replacement, or another cache algorithm. The cache algorithm may swap memory pages between a tier of memory devices and/or storage devices. The devices may be ordered based on speed of access, such as latency of memory accesses, for the application of the cache algorithm. The devices may include, for example, the following devices: dynamic random access memory (DRAM) on local host 105, DRAM on an external host 105, flash memory, redundant array's of independent disks (RAIDs), magnetic tape storage, non-volatile memory, persistent memory, phase-change memory, ferroelectric RAM, Magnetoresistive RAM, micro-electro-mechanical systems memory.

Hardware platform 106 of each host 105 may include components of a computing device such as one or more processors (CPUs) 108, system memory 110, a network interface 112, storage system 114, a local host bus adapter (MBA) 115, and other I/O devices such as, for example, a mouse and keyboard (not shown). CPU 108 is configured to execute instructions, for example, executable instructions that perform one or more operations described herein and that may be stored in memory 110 and in storage 114. Network interface 112 enables host 105 to communicate with other devices via a communication medium, such as network 122, network 126, or links 128. Network interface 112 may include one or more network adapters, also referred to as Network Interface Cards (NICs). Storage system 114 represents local persistent storage devices (e.g., one or more hard disks, flash memory modules, solid state disks, and/or optical disks). Host bus adapter (HBA) couples host 105 to one or more external storages (not shown), such as a storage area network (SAN). Other external storages that may be used include network-attached storage (NA S) and other network data storage systems, which may be accessible via NIC 112.

System memory 110 is hardware allowing information, such as executable instructions, configurations, and other data, to be stored and retrieved. Memory 110 is where programs and data are kept when CPU 108 is actively using them. For example, CPU 108 may be configured to access data stored in memory 110 using direct addressing of locations of memory 110. Direct addressing means that data in memory 110 is accessed by CPU 108 using load and store instructions, rather than input/output (I/O) operations. As used herein, "load" and "store" instructions are instructions issued directly by CPU 108 to memory 110, without having to go through device drivers and I/O controllers. In contrast, I/O operations are communicated by CPU 108 through a device driver to an I/O controller before it reaches an I/O device, such as to storage 114. Then, the I/O device performs the I/O operations and returns the results of the I/O operation through an I/O controller and a device driver to CPU 108. Generally, load and store instructions to memory have a lower overhead than I/O operations to I/O devices.

Memory 110 may be volatile memory or non-volatile memory. Volatile or non-persistent memory is memory that needs constant power in order to prevent data from being erased. Volatile memory describes conventional memory, such as dynamic random access memory (DRAM). Non-volatile memory is memory that is persistent (non-volatile). Non-volatile memory is memory that retains its data after having power cycled (turned off and then back on). Non-volatile memory is byte-addressable, random access non-volatile memory.

CMC 132 is a controller software that allocates memory regions between hosts 105 within data center 102, and that keeps track of global memory metadata 134 regarding the allocated memory. For example, CMC 132 may allocate 50 GB of memory from memory $110_N$ of host $105_N$ to host $105_1$, for use of host $105_1$. As used herein, the term "global" refers to data center 102, such as a component located within, a function performed within, or information obtained from within data center 102. Global memory metadata is data about memory allocated between hosts 105, and global memory data may include data on; how many hosts 105 are available to share memory 110 with other hosts 105, identity of the available hosts, how much memory each available host 105 is contributing, and how much memory each host 105 or available host 105 is using. CMC 132 may be a virtual appliance such as one of VMs 120, a physical device, or a software module running within host(s) 105 such as within hypervisor(s) 116. CMC 132 may be a centralized software or a distributed software distributed among one or more VMs 120 or among, one or more hypervisors 116. CMC 132 communicates with hosts 105 via a network, shown as a management network 126.

In an embodiment, if a memory region or memory page is allocated for the use of host 105 or VM 120, then that memory region or memory page is allocated for the exclusive use of the host 105 or VM 120, and that allocated memory region or page is not shared among a plurality of hosts 105 or VMs 120. In an embodiment, if a memory region or memory page is allocated for the use of host 105 or VM 120, then that memory region or memory page is reserved for the use of host 105 or VM 120 such that no other host 105 or VM 120 is allowed to use the memory region or memory page.

Virtualization manager 130 communicates with hosts 105 via a network, shown as a management network 126, and carries out administrative tasks for data center 102 such as communicating with controller 132 for managing hosts 105, managing local VMs 120 running within host 105, provisioning VMs, migrating VMs from one host to another host, and load balancing between hosts 105. Virtualization manager 130 may be a computer program that resides and executes in a central server in data center 102 or, alternatively, virtualization manager 130 may run as a virtual appliance (e.g., a VM) in one of hosts 105. One example of a virtualization manager 130 is the vCenter Server™ product made available from VMware, Inc. In an embodiment, CMC 132 may be a component of virtualization manager 130.

Gateway 124 provides VMs 120 and other components in data center 102 with connectivity to an external network. Gateway 124 may manage external public IP addresses for VMs 120 and route traffic incoming to and outgoing from data center 102 and provide networking services, such as firewalls, network address translation (NAT), dynamic host configuration protocol (DHCP) and load balancing. Gateway 124 may use data network 122 to transmit data network packets to hosts 105. Gateway 124 may be a virtual appliance, a physical device, or a software module running within host 105. Gateway 124 may include two gateways: a management gateway for management network 126 and a data gateway for data network 122.

As mentioned above, hosts 105 may have substantially similar components, but some hosts 105 may be "memory servers" or "memory expansion hosts" configured primarily to have their memory allocated for the use of other hosts 105. Host $105_N$ is depicted to show components of an exemplary memory expansion host. Host $105_N$ may have but does not necessarily have a hypervisor 116 or VMs 120. Host $105_N$ may have a standard operating system. Host $105_N$ may have a large amount of low-latency system memory 110 for use of other hosts 105 within data center 102. Host $105_N$ may have but does not necessarily have a memory manager, and instead, allocation of system memory $110_N$ may be tracked by a combination of CMC 132 and memory managers 136 in other hosts 105.

Figure 2:
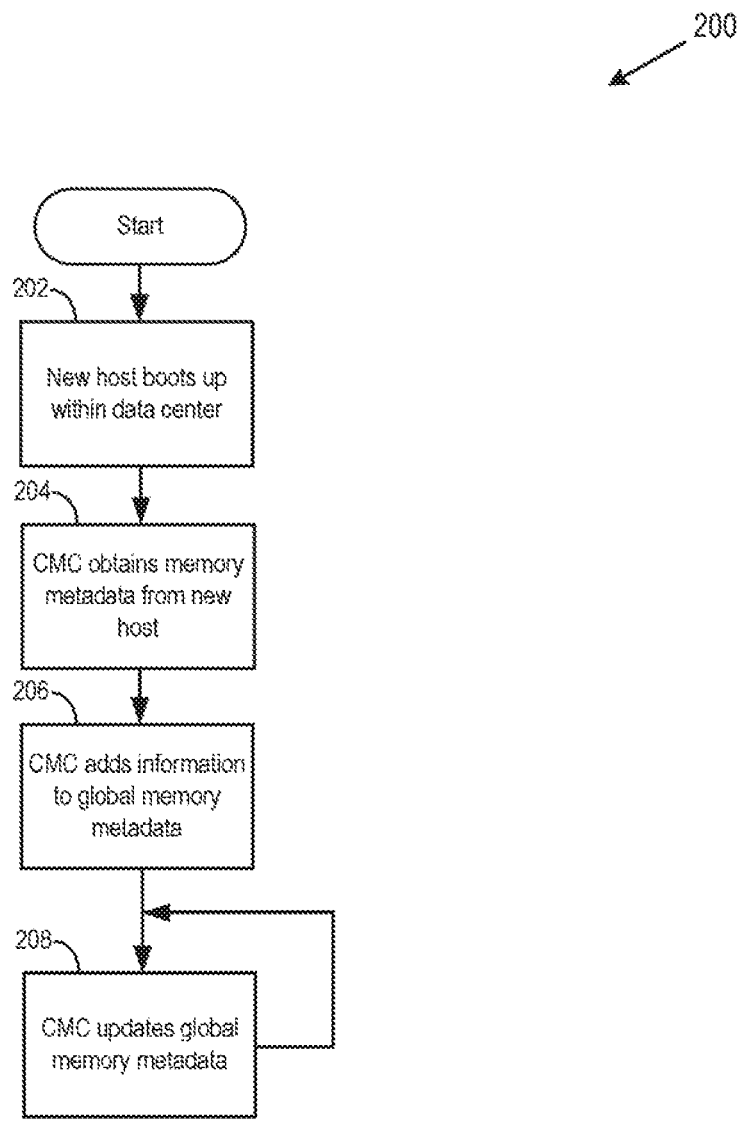
FIG. 2 depicts a flow diagram of a method of onboarding a new host onto a data center, according to an embodiment.

FIG. 2 depicts a flow diagram of a method 200 of onboarding a new host 105 onto data center 102, according to an embodiment. At block 202, a new host 105 is booted up and/or connected to data center 102 through networks 122/126 and links 128. As part of boot up, VMS 120 may be instantiated on the new host 105.

At block 204, CMC 132 and new host 105 communicate so that CMC obtains memory metadata from the new host 105. The metadata may include, for example, identity of the new host 105, how much local memory 110 the new host 105 has, and how much memory the new host is currently using. From this information, CMC 132 may derive data such as whether the new host 105 can contribute memory to other hosts 105 and how much memory can be contributed, or whether the new host 105 needs memory from other hosts 105 and how much memory is needed.

At block 206, CMC 132 adds the memory metadata obtained and derived at block 204 to global memory metadata 134.

At block 208, CMC 132 obtains updated memory metadata from new host 105, similar to the metadata obtained at block 204, and CMC 132 updates global memory metadata 134. Block 208 may be performed after waiting a period of time, such as for example, a period of one millisecond, one second, ten seconds, one minute, or ten minutes. Block 208 may be initiated by CMC 132 or by the new host 105. Block 208 may be initiated by CMC 132 when CMC 132 polls the new host 105. Block 208 may be initiated by the new host 105 when the new host 105 determines that memory metadata of new host 105 has changed significantly as compared to the last time that memory metadata of new host 105 was provided to CMC 132 and added to global memory metadata 134. Alter block 208, method 200 may repeat block 208 indefinitely. Method 200 may wait for a period of time between each repetition of block 208, and the period of time may be similar to a length of time listed above for the period between block 206 and block 208. Block 208 may be repeated for each host 105 within data center 102.

Figure 3:
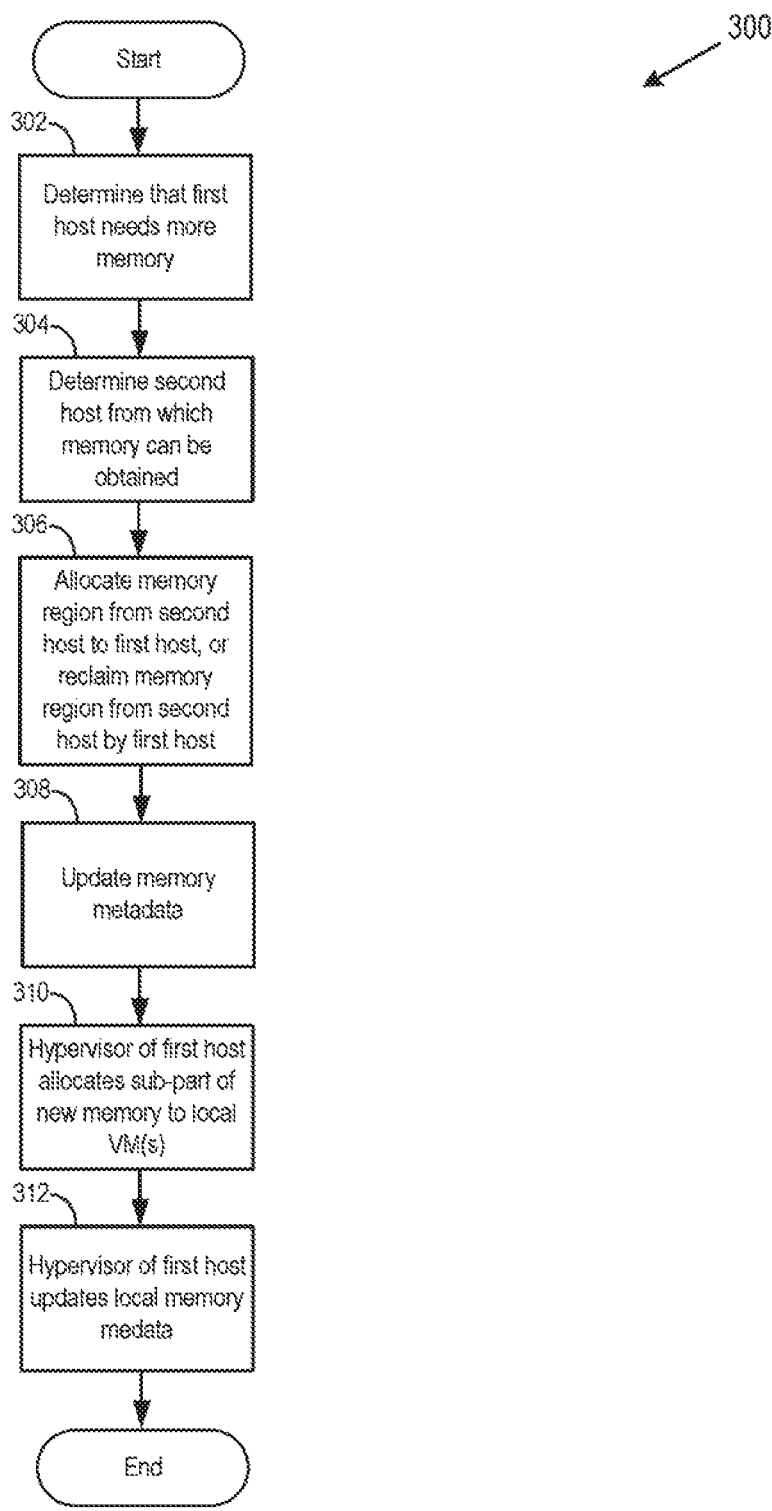
FIG. 3 depicts a flow diagram of a method of allocating or reclaiming memory, according to an embodiment.

FIG. 3 depicts a flow diagram of a method 300 of allocating or reclaiming memory, according to an embodiment. For the purpose of illustrating method 300, host $105_1$ will be used as a first host to which memory is being allocated, and host $105_2$ will be used as a second host from which memory is being allocated or reclaimed to the first host $105_1$.

At block 302, CMC 132 and/or first host $105_1$ determine that host $105_1$ needs more memory. The determination can be made by, for example, comparing memory metadata metrics, such as current memory usage by the first host $105_1$ and the total memory available to the first host $105_1$. If the difference is past (e.g., less than) a certain threshold, such as for example, 1 GB, 5 GB, 10 GB, or 50 GB, then the determination may be made that first host $105_1$ needs more memory. Metadata for the determination may be obtained from local memory metadata $138_1$ and/or from global memory metadata 134. The determination may be done automatically by a computer system, or manually by a computer operator, or both (such as if the computer system alerts the operator and the operator makes the final determination). The determination may occur when a new VM 120 is launched at a host 105 where the VM 120 will require more memory 110 than presently available at the local host 105 on which the VM 120 was launched.

At block 304, CMC 132 determines which second host 105 can provide its memory 110 for the use of first host $105_1$, or determines from which host 105 the first host $105_1$ can reclaim some of local memory $110_1$ of host $105_1$.

The determination as to which second host 105 can provide its memory 110 for the use of first host 105$_1$ may be made by comparing memory metadata metrics, such as how much of memory 110 of each host 105 is being used by local host 105 and other hots 105, and how much of memory 110 of each host is available. If the difference is past (e.g., greater than) a certain threshold, such as for example, 10 GB, 50 GB, or 100 GB, then the determination may be made that a second host 105$_1$ can provide some of its memory to another host 105$_1$. If more than one host 105 is capable of providing some of its memory 110 to the first host 105$_1$, then the host 105 that has the most available memory, or that has the fastest link 128 to the first host 105$_1$ may be chosen as the second host 105$_2$ to provide a portion of its memory 110$_2$ to the first host 105$_1$.

Alternatively to determining which second host 105 can provide its memory 110 for the use of first host 105$_1$, CMC 132 may instead determine from which host 105 the first host 105$_1$ may reclaim some of its local memory 110$_1$, if other hosts 105 are using memory of first host 105$_1$. The determination may be made by identifying hosts to which memory 110$_1$ of first host 105$_1$ has been allocated. Then, a determination may be made as to how much of allocated memory, total from all hosts 105 or only from first host 105$_1$, is being used by each identified host 105. If the amount of memory used by a host 105 is less than memory allocated by a certain threshold, such as 10 GB, 50 GB, or 100 GB, then that second host 105$_2$ may be chosen from which to reclaim a region of memory 110$_1$ of the first host 105$_1$ back to the first host 105$_1$.

At block 306, a region of memory 110$_2$ of the second host 105$_2$ is allocated to the first host 105$_1$, or alternatively, a region of memory 110$_1$ of the first host is reclaimed from the second host 105$_2$, as determined in block 304. The allocation and reclaiming may be performed by methods known in the art, such as by remapping page table entries of page tables within hypervisor 116$_1$ to the memory pages of the newly allocated or reclaimed memory region, and/or by setting to null page table entries within hypervisor 116$_2$ that are used to point to memory pages of the newly allocated or reclaimed memory region. In an embodiment, allocation of memory regions as described in block 306 is performed by updating global memory metadata 134 and/or corresponding local memory metadata, without updating or remapping page table entries, while allocation of sub-parts of memory regions, as described in block 310 below, is performed by remapping page table entries. In an embodiment, reclamation of memory regions as described in block 306 is performed by updating global memory metadata 134 and/or corresponding local memory metadata without updating or remapping page table entries, while reclamation of sub-parts of memory regions, as described in block 310 below, is performed by remapping page table entries.

At block 308, CMC 132 updates global memory metadata 134 to indicate that a portion of memory 110 has been provided from host 105$_2$ to host 105$_1$, either through allocation or reclaiming, as described above. Also as part of block 308, memory manager 136$_1$ updated local memory metadata 138$_1$ to indicate that a portion of memory 110 has been provided from host 105$_2$ to host 105$_1$, either through allocation or reclaiming.

At block 310, memory manager 136$_1$ of hypervisor 116$_1$ allocates a sub-portion of the memory obtained at block 306 to one or more VMs 120$_1$ running on host 105$_1$. The sub-portion may be as small as one memory page. The granularity of dividing the memory obtained at block 306 into sub-portions may be one memory page. It is important that the allocation by memory manager 136 may be performed independently of CMC 132, which is advantageous because it avoids communication between the host 105$_1$ and CMC 132, saving resources and time, and lowering overhead costs.

At block 312, memory manager 136$_1$ of hypervisor 116$_1$ updates local memory metadata 138$_1$ to indicate the new allocation of memory pages performed at block 310. After block 312, method 300 ends.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com), OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

In an embodiment, hosts 105 may be virtual hosts as part of a private or public cloud, and VMs 120 may be running within those virtual hosts 105 rather than in physical hosts 105, possibly in the context of nested virtualization. Data center 102 may be a virtual data center that as part of a private or public cloud. Networks 122 and 126 may be virtual networks as part of a private or public cloud. Hardware platform 106 may be a virtual hardware platform as part of a private or public cloud.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of obtaining memory for use by a first host, the method comprising:
   determining a second host that is capable of providing memory for use by the first host;
   obtaining a region of memory from the second host for use by the first host, wherein the region of memory is local to the first host and wherein obtaining the region of memory from the second host comprises reclaiming, by the first host, the region of memory from use by the second host;
   updating a first memory metadata to indicate that the region of memory has been obtained from the second host for use by the first host;
   dividing, by the first host, the obtained region of memory into one or more sub-portions; and
   allocating the one or more sub-portions for use by one or more virtual computing instances (VCIs) executing on the first host.

2. The method of claim 1, the method further comprising, prior to the determining:
   booting up the first host and instantiating the one or more VCIs on the first host;
   obtaining metadata associated with memory usage of the first host, wherein the obtained metadata comprises an amount of memory the first host has available and the amount of memory the first host is using; and
   updating the first memory metadata to add the obtained metadata.

3. The method of claim 2, the method further comprising polling the first host and the second host to obtain updated memory metadata.

4. The method of claim 1, wherein the first host uses the obtained region of memory as a cache for memory pages, the method further comprising:
   executing, by the first host, a cache algorithm to swap the memory pages among a tier of memory devices, the tier of memory devices comprising one or more of a device with dynamic random access memory (DRAM), flash memory, redundant arrays of independent disks (RAIDs), magnetic tape storage, non-volatile memory, persistent memory, phase-change memory, ferroelectric RAM, magnetoresistive RAM, or micro-electro-mechanical systems memory.

5. The method of claim 4, wherein the cache algorithm is executed by a virtualization software of the first host, wherein the one or more VCIs are virtualized by the virtualization software.

6. The method of claim 1, wherein the obtained region of memory is used exclusively by the first host.

7. The method of claim 1, wherein the updating the first memory metadata is performed by a central controller software executing within a data center, wherein the central controller software uses the first memory metadata to track allocation of memory to hosts within the data center.

8. The method of claim 1, wherein the obtained region of memory is accessible using direct addressing.

9. A non-transitory computer readable medium comprising instructions to be executed in a processor of a computer system, the instructions when executed in the processor cause the computer system to carry out a method of obtaining memory for use by a first host, the method comprising:
  determining a second host that is capable of providing memory for use by the first host;
  obtaining a region of memory from the second host for use by the first host, wherein the region of memory is local to the first host, and wherein obtaining the region of memory from the second host comprises reclaiming, by the first host, the region of memory from use by the second host;
  updating a first memory metadata to indicate that the region of memory has been obtained from the second host for use by the first host;
  dividing, by the first host, the obtained region of memory into one or more sub-portions; and
  allocating the one or more sub-portions for use by one or more virtual computing instances (VCIs) executing on the first host.

10. The non-transitory computer readable medium of claim 9, the method further comprising, prior to the determining:
  booting up the first host and instantiating the one or more VCIs on the first host;
  obtaining metadata associated with memory usage of the first host, wherein the obtained metadata comprises an amount of memory the first host has available and the amount of memory the first host is using; and
  updating the first memory metadata to add the obtained metadata.

11. The non-transitory computer readable medium of claim 10, the method further comprising polling the first host and the second host to obtain updated memory metadata.

12. The non-transitory computer readable medium of claim 9, wherein the first host uses the obtained region of memory as a cache for memory pages, the method further comprising:
  executing, by the first host, a cache algorithm to swap the memory pages among a tier of memory devices, the tier of memory devices comprising one or more of a device with dynamic random access memory (DRAM), flash memory, redundant arrays of independent disks (RAIDs), magnetic tape storage, non-volatile memory, persistent memory, phase-change memory, ferroelectric RAM, magnetoresistive RAM, or micro-electro-mechanical systems memory.

13. The non-transitory computer readable medium of claim 12, wherein the cache algorithm is executed by a virtualization software of the first host, wherein the one or more VCIs are virtualized by the virtualization software.

14. The non-transitory computer readable medium of claim 9, wherein the obtained region of memory is used exclusively by the first host.

15. The non-transitory computer readable medium of claim 9, wherein the updating the first memory metadata is performed by a central controller software executing within a data center, wherein the central controller software uses the first memory metadata to track allocation of memory to hosts within the data center.

16. A computer system comprising:
  a first host;
  one or more virtual computing instances (VCIs) executing on the first host;
  a second host;
  a processor, wherein the processor is programmed to carry out a method of obtaining memory for use by the first host, the method comprising:
    determining the second host is capable of providing memory for use by the first host;
    obtaining a region of memory from the second host for use by the first host wherein the region of memory is local to the first host, and wherein obtaining the region of memory from the second host comprises reclaiming, by the first host, the region of memory from use by the second host;
    updating a first memory metadata to indicate that the region of memory has been obtained from the second host for use by the first host;
    dividing, by the first host, the obtained region of memory into one or more sub-portions; and
    allocating the one or more sub-portions for use by the one or more VCIs executing on the first host.

* * * * *